United States Patent [19]

Shishido

[11] 4,041,796
[45] Aug. 16, 1977

[54] FASTENING DEVICE FOR TILTABLE STEERING WHEEL ASSEMBLY

[75] Inventor: Yoshio Shishido, Toyota, Japan

[73] Assignee: Toyota Jidosha Kogyo Kabushiki Kaisha, Toyota, Japan

[21] Appl. No.: 641,531

[22] Filed: Dec. 17, 1975

[30] Foreign Application Priority Data

Dec. 28, 1974 Japan .................................. 50-1773[U]

[51] Int. Cl.² ............................................. B62D 1/16
[52] U.S. Cl. ........................................ 74/493; 74/531
[58] Field of Search ........................... 74/493, 495, 531

[56] References Cited

U.S. PATENT DOCUMENTS

| | | | |
|---|---|---|---|
| 3,279,277 | 10/1966 | Stevens et al. | 74/493 |
| 3,518,895 | 7/1970 | Boechler et al. | 74/493 |
| 3,533,302 | 10/1970 | Hansen | 74/493 |
| 3,570,322 | 3/1971 | Krouse | 74/493 |
| 3,955,439 | 5/1976 | Meyer | 74/493 |

Primary Examiner—Samuel Scott
Assistant Examiner—Randall Heald
Attorney, Agent, or Firm—Stevens, Davis, Miller & Mosher

[57] ABSTRACT

In a fastening device for a tiltable steering wheel assembly, the locking lever of the device is set in the locked position beyond the rotary dead point of a rotary cam element pivoted on a fastening bolt so as to firmly hold the steering column tube assembly at a desired angle with respect to the driver. The locking lever is positioned substantially parallel with respect to the steering column tube assembly in the locked position to prevent unexpected release of the locking lever by the driver's legs.

8 Claims, 9 Drawing Figures

FASTENING DEVICE FOR TILTABLE STEERING WHEEL ASSEMBLY

BACKGROUND OF THE INVENTION

The present invention relates to a tiltable steering wheel assembly for a vehicle, and more particularly to a fastening device to adjust and hold the steering wheel at a desired angle with respect to the driver.

A fastening device for a tiltable steering wheel assembly has been proposed which comprises a pair of fitting brackets respectively mounted on the vehicle body structure, a steering column tube journalling a steering shaft therein and a locking lever assembly for fastening the fitting brackets to each other. The problem existing in the conventional fastening device is, however, how to arrange the locking lever assembly so as to prevent any unexpected release thereof caused by the driver's legs, vibrations of the vehicle body and/or shocks given to the steering column assembly. Other problems are to ensure the setting of the locking lever in the locked position and to ensure the relative fastening of the fitting brackets.

SUMMARY OF THE INVENTION

The primary object of the present invention is, therefore, to provide a fastening device for a tiltable steering wheel assembly, wherein the locking lever of the device is set in the locked position beyond the rotary dead point of a rotary cam element pivoted on a fastening bolt so as to firmly hold the steering column tube assembly at a desired angle with respect to the driver, and wherein the locking lever is positioned parallel with respect to the steering column tube assembly to prevent unexpected release of the latching lever by the driver's legs.

The present invention is directed to a fastening device for a tiltable steering wheel assembly including a steering shaft tiltably connected to steering gear means, a column tube having the steering shaft journalled therein and a steering wheel mounted on the steering shaft. The fastening device comprises a first bracket mounted on a portion of the vehicle body structure and having a pair of opposing arms, a second bracket secured to the column tube and having a pair of opposing arms coupled and pivoted to the pair of arms of the first bracket to hold the column tube at a desired angle, a fastening bolt assembled transversely across the coupled portions of the first and second brackets, a lock nut threaded on one end of the bolt at one side of the coupled portions of the first and second brackets, a pressure plate slidably mounted on the other end of the bolt at the other side of the coupled portions of the first and second brackets and opposed to the lock nut, a cam element pivoted on the other end of the bolt at the outside of the pressure plate and including a curved cam surface to press the pressure plate towards the lock nut and a flat surface to be pressed against the pressure plate in the locked position, the center of the curved cam surface being eccentric with respect to the pivot axis of the cam element to engage the flat surface of the cam element with the pressure plate beyond the rotary dead point of the cam element, and a locking lever integrally connected to the cam element to be positioned substantially parallel with respect to the column tube in the locked position, whereby when the locking lever is set in the locked position, the first and second brackets are fastened to each other between the lock nut and the pressure plate relatively pressed by the flat surface of the cam element and the engagement of the pressure plate and the cam element is held due to reaction force generated on the bolt.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 1:
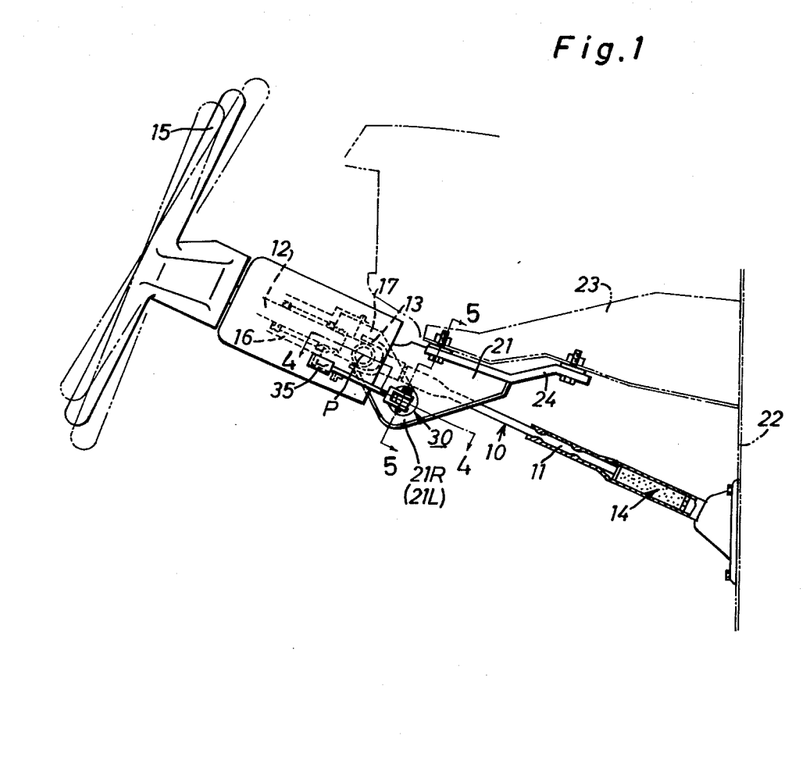
FIG. 1 is a side view of a preferred embodiment of a tiltable steering wheel assembly in accordance with the present invention.

Referring now to the drawings, particularly to FIG. 1, there is disclosed a preferred embodiment of the present invention. In FIG. 1, a steering shaft 10 comprises a lower shaft 11 and an upper shaft 12 which are connected to each other with a universal joint 13. The lower shaft 11 is connected at the lower end thereof with a conventional impact energy absorbing device 14 which is connected to a steering gear box (not shown) through a conventional flexible coupling (not shown). The energy absorbing device 14 is provided therein with solid resilient materials such as silicone synthetic rubber to be pushed through orifices so as to absorb the impact energy. The upper shaft 12 is journalled within a column tube 16 and has a steering wheel 15 fixedly mounted on the top end of the upper shaft 12.

Figures 2, 3:
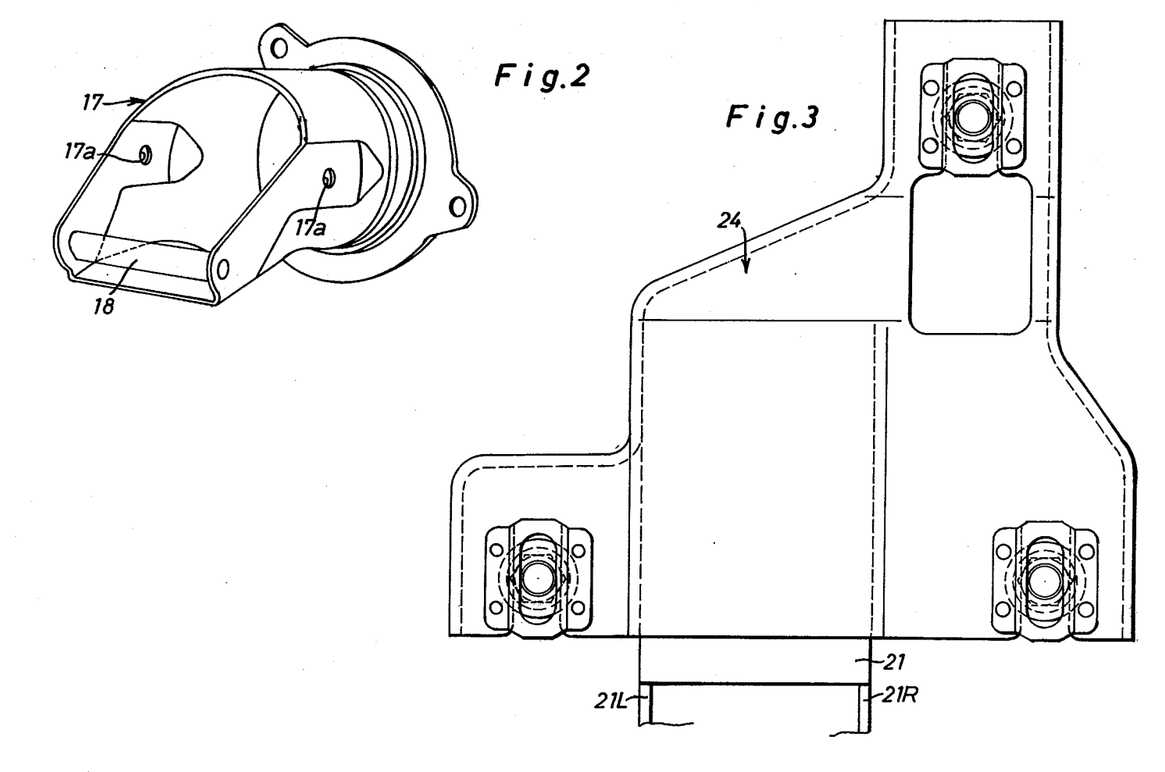
FIG. 2 is an enlarged perspective view of a connecting bracket shown in FIG. 1.
FIG. 3 is an enlarged plan view of a break-away bracket shown in FIG. 1.

The steering column tube 16 is integrally provided with a connecting bracket 17 having a U-shaped cross-section. As well illustrated in FIGS. 1 and 2, the connecting bracket 17 extends downward and is tiltably pivoted about pivots P, P at its opposite portions 17a, 17a, corresponding to the center of the universal joint 13, to a pair of right and left arms 21R, 21L of a supporting bracket 21. The connecting bracket 17 is further provided with a sleeve 18 which is transversely fixed on the front end of the connecting bracket 17 (see FIG. 2).

Figure 5:
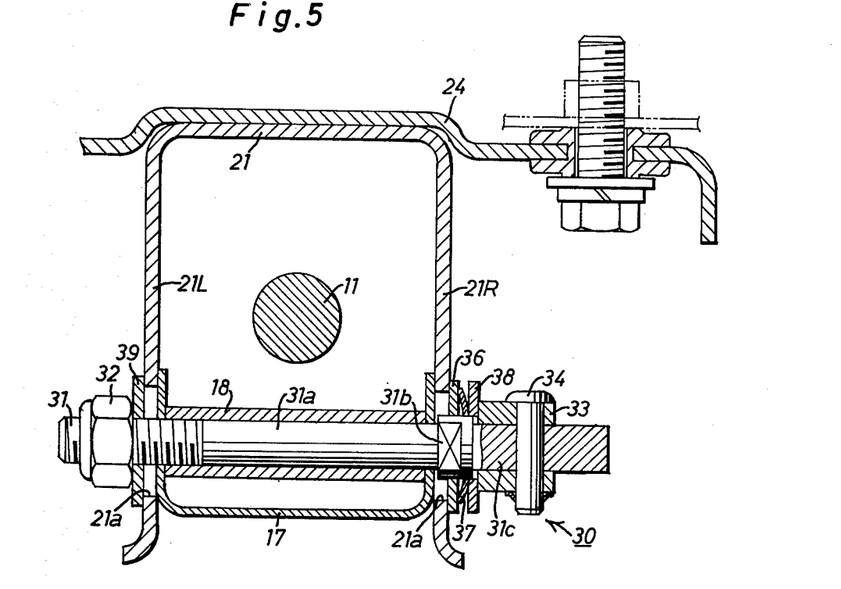
FIG. 5 is a enlarged view of a vertical section taken along line 5—5 of FIG. 1.

The supporting bracket 21 has a U-shaped cross-section, as shown in FIG. 5, and is mounted on a stationary bracket 23, which is secured on a fire wall 22, by way of a conventional break-away bracket 24. As shown in FIG. 5, the right and left arms 21R, 21L of the supporting bracket 21 are respectively provided at their lower portions with part circumferentially extending slots 21a, 21a which are defined about centers located at the pivots P, P. Thus, the column tube 16 is vertically tiltable around the pivots P, P with respect to the supporting bracket 21 and the connecting bracket 17 is fastened at its lower end to the lower portions of the supporting arms 21R, 21L by means of a fastening device 30 in accordance with the present invention such that the column tube 16 is firmly held at a selected angle with respect to the lower shaft 11.

Figure 4:
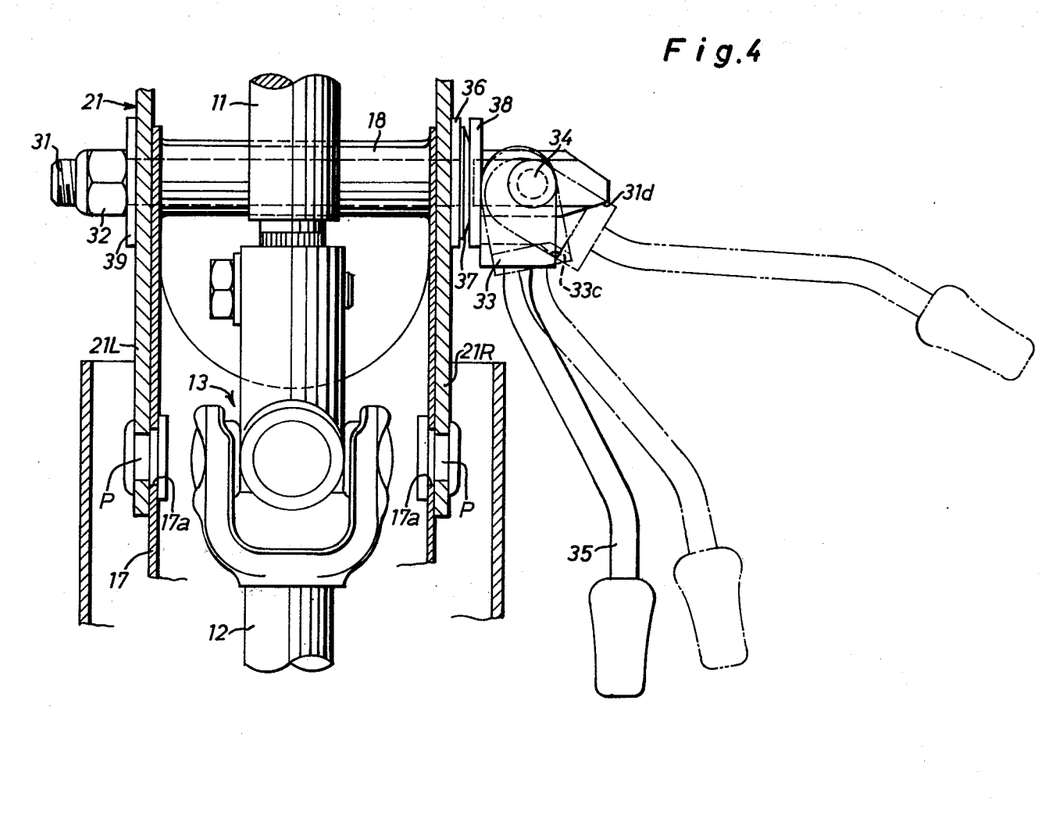
FIG. 4 is an enlarged cross-sectional view taken along line 4—4 of FIG. 1.

As best illustrated in FIGS. 4 and 5, the fastening device 30 comprises a bolt transversely inserted into the sleeve 18 of the connecting bracket 17 through slots 21a, 21a of the supporting arms 21R, 21L, a lock nut 32 threaded on the left end of the bolt 31 through a washer 39, a cam 33 pivoted on the right end of the bolt 31 which also extends by a pin 34, a locking lever 35 integrally connected to the cam 33, and a set of a washer 36, a dish spring 37 and a pressure plate 38 which are installed on the bolt 31 between the cam 33 and the right arm 21R of the supporting bracket 21. As shown in FIG. 5, the bolt 31 includes a body portion 31a in the sleeve 18 of the connecting bracket 17, a collar portion 31b engaged with the slot 21a of the right supporting arm 21R to prevent the rotation of the bolt 31, and a head portion 31c to pivot the cam 33 thereon. The head portion 31c of the bolt 31 is provided with a stopper surface 31d to receive the cam 33 thereon when the cam 33 is rotated to the unlocked position, as shown in FIG. 4.

Figure 6:
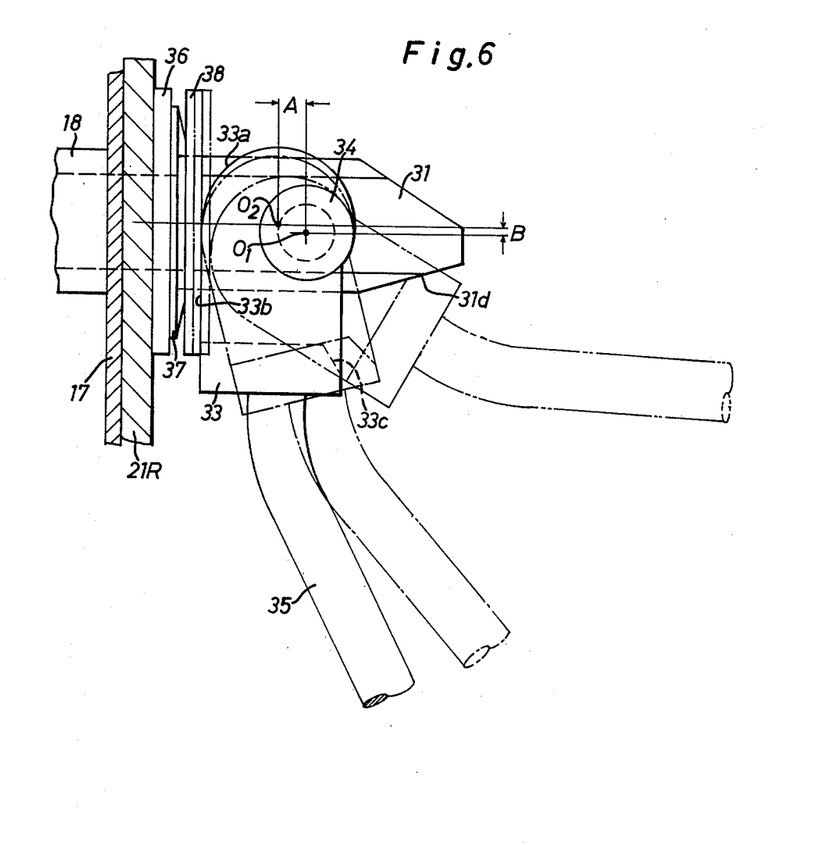
FIG. 6 is an enlarged view of a locking lever assembly shown in FIG. 4.

The cam 33 has a U-shaped cross-section and, as best shown in FIG. 6, is provided with a cam surface 33a of a half-circle, a flat locking surface 33b and a stopper surface 33c to be engaged with the stopper surface 31d of the bolt 31. The cam 33 is so pivoted on the bolt 31 as to have the center $O_2$ of the cam surface 33a displaced against the axial centre $O_1$ of the pivot pin 34, leftward and upward (in the figure) respectively by distances A and B in the locked position. The locking lever 35 is arranged to be positioned substantially parallel to the steering column tube 16 in the locked position and to be positioned transverse to the column tube 16 in the unlocked position (see FIGS. 1 and 4).

Hereinafter, the function of a fastening device 30 will be described in detail. While the fastening device 30 is positioned in its locked position, as shown with solid lines in FIG. 4, the connecting bracket 17 is propped by and held between the pair of arms 21R, 21L of the supporting bracket 21 by a predetermined resilient force produced on the dish spring 37, which is compressed by the flat locking surface 33b of the cam 33 by way of the pressure plate 38, so that the upper shaft 12 is firmly held at a selected angle to hold the steering wheel 15 at a desired angle with respect to the driver. In this locked condition of the fastening device 30, the locking lever 35 is positioned beyond its rotary dead point or the operation change-over point of the dish spring 37, which is illustrated with dot-and-solid lines in FIG. 6. Thus, even if some rotary inertia caused by vibrations of the vehicle body and/or shocks given to the steering shaft 10 acts on the locking lever 35, the locking lever 35 returns to and is maintained in its locked position by the resilient force of the dish spring 37. Furthermore, any rotation of the bolt 31 is prevented by engagement of the collar portion 31b of the bolt 31 with the slot 21a of the right supporting arm 21R so that the locking lever 35 is always held in the position parallel to the column tube 16 and may not be moved by the driver's legs during driving.

When it is desired to adjust the angle of the steering wheel 15 with respect to the driver, the locking lever 35 is rotated forward over the rotary dead point to release the fastening device 30. In this instance, the rotation of the locking lever 35 is limited by engagement between the stopper surfaces of the cam 33 and the bolt 31 and the dish spring 37 will continue to have some urging force to hold the connecting bracket 17 between the pair of arms 21R, 21L of the supporting bracket 21. This prevents the upper shaft 12 from rotating downward around the pivots P, P by the weight of the shaft 12 itself.

Thus, the steering wheel 15 can freely be tilted by a desired amount, then the upper shaft 12 is correspondingly tilted with its rotation center at the universal joint 13 and the connecting bracket 17 is also correspondingly rotated with its rotation axis at the pivots P, P. Thereafter, when the locking lever 35 is moved back to the position parallel with respect to the column tube 16 over its rotary dead point, the flat locking surface 33b of the cam 33 engages resiliently with the pressure plate 38 to lock the fastening device 30 so that the steering wheel 15 is firmly held at the selected angle with respect to the driver. It will be also noted that when some abrasion is observed on the cam face 33a of the cam 33, the lock nut 32 is further threaded inwardly to compensate for the abrasion.

Figure 7:
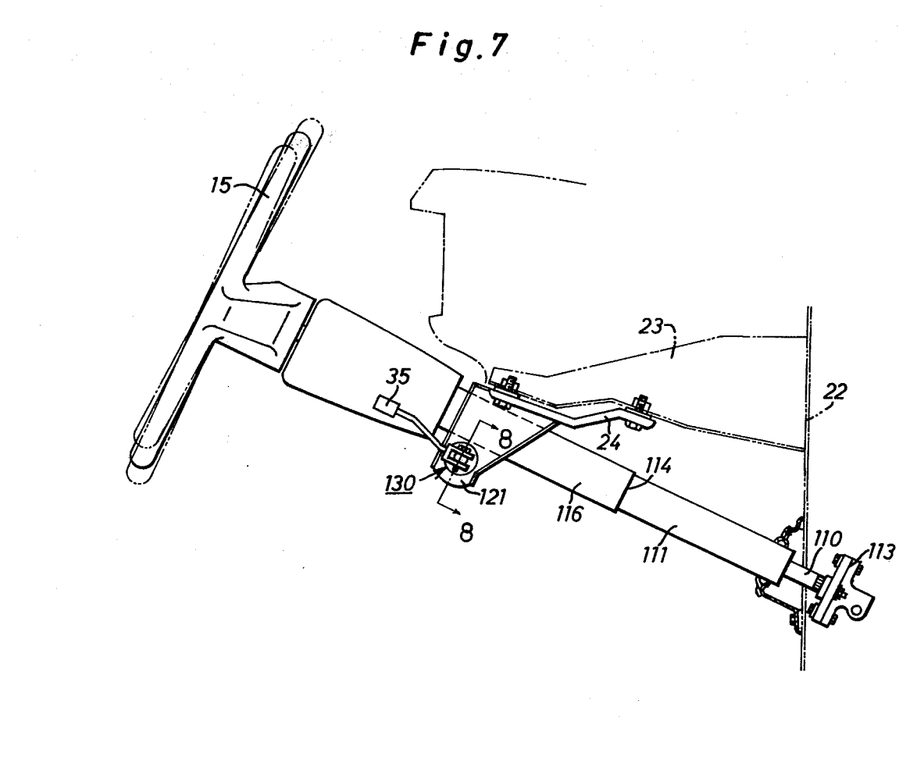
FIG. 7 is a side view of another embodiment of the present invention.
Figure 8:
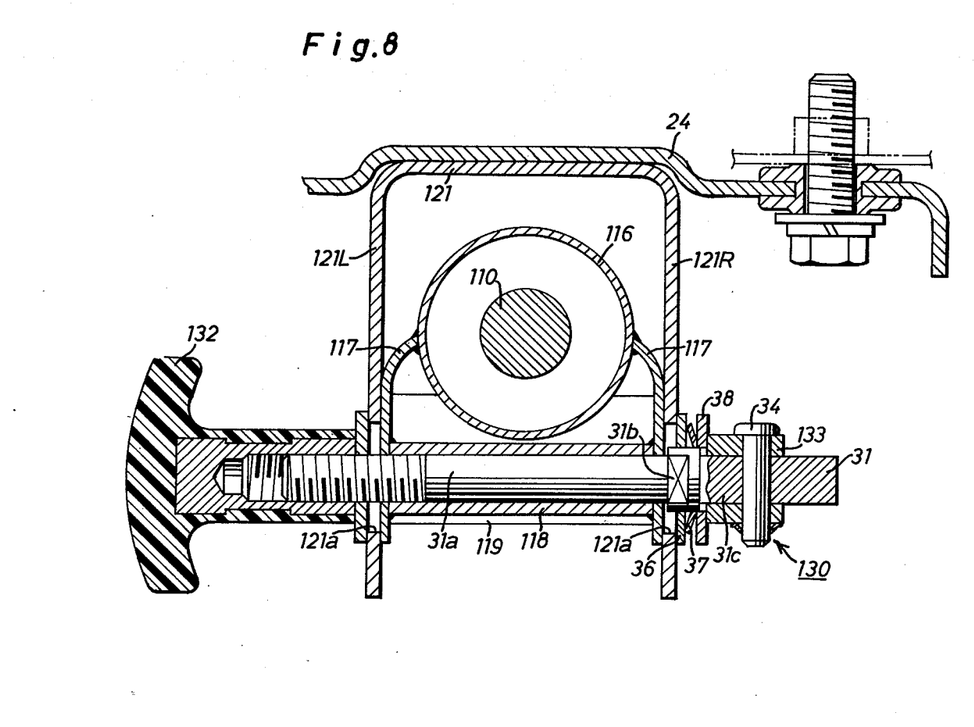
FIG. 8 is an enlarged view of a vertical section taken along line 8—8 of FIG. 7.
Figure 9:
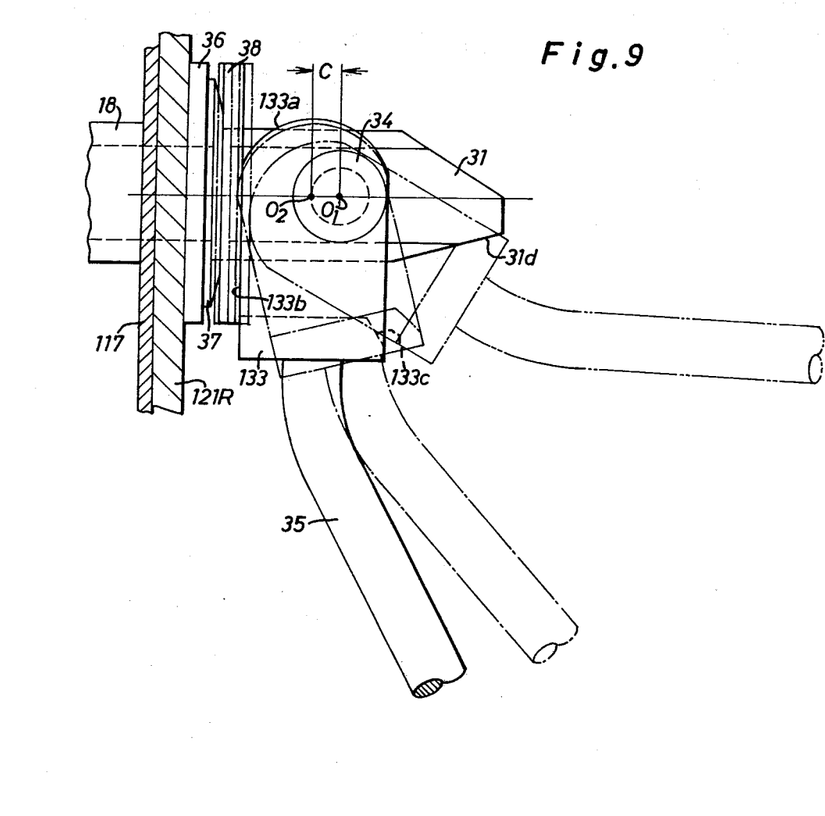
FIG. 9 is a plan view of a locking lever assembly shown in FIG. 8.

Reference is made to FIGS. 7, 8 and 9 for another embodiment of the present invention, wherein the same reference numerals and characters indicate the same component parts and portions as in the previous embodiment. In FIG. 7, a steering shaft 110 is journalled within upper and lower column tubes 116 and 111. The lower end of the shaft 110 is connected to a conventional steering gear box (not shown) through a flexible coupling 113 and the steering wheel 15 is mounted on the top end of the shaft 110. The upper column tube 116 is telescopically slidable over the lower column tube 111 and a conventional ball-type impact energy absorbing device 114 is assembled within the coupled portions of the upper and lower column tubes 116 and 111.

The upper column tube 116 is tiltably supported by a supporting bracket 121 by way of a fastening device 130. As well shown in FIG. 8, a pair of connecting brackets 117, 117, which extend downward, are secured respectively to the opposite sides of the upper column tube 116. The connecting brackets 117, 117 are provided with a transverse reinforcement member 119 and a sleeve 118 integrally secured on the free ends thereof. The supporting bracket 121 has a U-shaped cross-section and is mounted on the stationary bracket 23, which is secured on the fire wall 22, by way of the break-away bracket 24. A pair of right and left arms 121R and 121L of the supporting bracket 121 are respectively provided at their lower portions with part circumferentially extending slots 121a, 121a which are defined about centers located at the flexible coupling 113, as shown in FIG. 8.

The fastening device 130 adapted in this embodiment is substantially as same as the one 30 in the previous embodiment with a few differences such as the shape of a lock nut 132 and the shape and pivoted position of a cam 133. The lock nut 132 is a wing nut and functions to adjust the clamping force given to the connecting brackets 117. The cam 113 is, as best shown in FIG. 9, provided with a cam surface 133a of a half-circle, a flat locking surface 133b and a stopper surface 133c. The cam 133 is so pivoted on the axis of the bolt 31 as to have the center $O_2$ of the cam surface 133a displaced leftward (in the figure) against the axial center $O_1$ of the pivot pin 34 by a distance C.

With this preferred embodiment, the tilting adjustment of the steering wheel 15 is conducted about an axis at the flexible coupling 113. All other functions are substantially as same as those of the previous embodiment.

Although in the above embodiments, the connecting bracket 17 or 117 is mounted on the column tube 16 or the upper column tube 116 and is gripped between and held by the pair of arms of the supporting bracket 21 or 121 fixed on the vehicle body, the supporting bracket 21 or 121 may be gripped and held by the connecting bracket 17 or 117. Furthermore, the dish spring 37 may be replaced with resilient characteristics of the bolt 31.

Although certain specific embodiments of the invention have been shown and described, it is obvious that many modifications thereof are possible. The invention, therefore, is not intended to be restricted to the exact showing of the drawings and descriptions thereof, but is considered to include reasonable and obvious equivalents.

What is claimed is:

1. A fastening device for a tiltable steering wheel assembly including a steering shaft tiltably connected to steering gear means, a column tube having said steering shaft journalled therein and a steering wheel mounted on said steering shaft, comprising:

a first bracket mounted on a portion of the vehicle body structure and having a pair of opposing arms;

a second bracket secured to said column tube and having a pair of opposing arms coupled and pivoted to the pair of arms of said first bracket to hold said column tube at a desired angle;

a fastening bolt extending transversely across the coupled portions of said first and second brackets;

a lock nut threaded on one end of said bolt at one side of the coupled portions of said first and second brackets;

a pressure plate slidably mounted on the other end of said bolt at the other side of the coupled portions of said first and second brackets;

a cam element pivoted on the other end of said bolt about an axis substantially perpendicular to the longitudinal axis of the bolt, said pressure plate being between said cam element and the coupled portions of said first and second brackets, said cam element including a curved cam surface to press said pressure plate towards said lock nut and a flat surface to be pressed against said pressure plate in the locked position, the center of the curved cam surface being eccentric with respect to the pivot axis of said cam element to engage the flat surface of said cam element with said pressure plate beyond the rotary dead point of said cam element; and a locking lever integrally connected to said cam element to be positioned substantially parallel with respect to said column tube in a locked position thereof whereby when said locking lever is set in the locked position, said first and second brackets are fastened to each other between said lock nut and said pressure plate which is pressed by the flat surface of said cam element and the pressing contact of said pressure plate and said cam element is held due to a reaction force generated on said bolt.

2. A fastening device for a tiltable steering wheel assembly as claimed in claim 1, further comprising resilient means on the other end of said fastening bolt to be compressed by the flat surface of said cam element by way of said pressure plate in the locked position, said resilient means being between said pressure plate and the coupled portions of the first and second brackets.

3. A fastening device for a tiltable steering wheel assembly as claimed in claim 2, wherein said resilient means comprises a dish spring mounted on the other end of said bolt between said pressure plate and a washer, said washer being between said dish spring and the coupled portions of said first and second brackets, said dish spring being compressed by the flat surface of said cam element by way of said pressure plate against said washer in the locked position.

4. A fastening device for a tiltable steering wheel assembly as claimed in claim 1, wherein said cam element is pivoted on said bolt such that the center of the curved cam surface is positioned on the axis of said bolt and displaced inwardly in a direction toward said one end of said bolt with respect to the pivot axis of said cam element in the locked position.

5. A fastening device for a tiltable steering wheel assembly as claimed in claim 1, wherein said cam element is pivoted on the axis of said bolt such that the center of the curved cam surface is positioned on the axis of said bolt and displaced inwardly in a direction toward said one end of said bolt with respect to the pivot axis of said cam element in the locked position.

6. A fastening device for a tiltable steering wheel assembly as claimed in claim 1, wherein said second bracket further comprises a sleeve, one end of said sleeve being secured to one arm of the second bracket and the other end of said sleeve being secured to the other arm of said second bracket, and said fastening bolt extends through said sleeve.

7. A fastening device for a tiltable steering wheel assembly as claimed in claim 1, wherein said lock nut is a wing nut adjustably threaded on one end of said bolt at one side of the coupled portions of said first and second brackets to adjust the clamping force between said wing nut and said pressure plate.

8. A fastening device for a tiltable steering wheel as claimed in claim 1, further comprising:

a pivot pin extending through the other end of said bolt, the longitudinal axis of said pivot pin being substantially perpendicular to the longitudinal axis of the bolt; and said cam element is pivotable about said pivot pin.

* * * * *